United States Patent Office 3,287,104
Patented Nov. 22, 1966

3,287,104
PRESERVATIVE MEDIUM SUITABLE FOR
PRESERVING CUT FLOWERS
Percival Ross Biggs, "The Alcove," 9 Toll Road, Rondebosch, Cape Province, Republic of South Africa
No Drawing. Filed Oct. 29, 1963, Ser. No. 319,664
9 Claims. (Cl. 71—2.4)

This invention relates to a preservative medium suitable for preserving cut flowers.

It is an object of the invention to provide means for prolonging the life of cut flowers beyond that which they have when placed merely in water.

According to the invention, a preservative medium for the preservation of cut flowers comprises about 1000–2000 parts by weight of sucrose as a water-soluble non-ionic nutrient medium; about 10–20 parts by weight of potassium sulphate as a source of potassium and sulphate ions; about 5–50 parts by weight of potassium dihydrogen phosphate as a source of phosphate and potassium ions and for controlling the pH of the medium; traces of boric acid as a source of boron; about 4–17 parts by weight of sodium benzoate as a fermentation and mould inhibitor; about 4–20 parts by weight of sodium meta-bisulphite as a fermentation and mould inhibitor; about 4–20 parts by weight of citric acid for controlling the pH of the medium within the range 2.5–5.5; and about 4–17 parts by weight of 8-hydroxy quinoline potassium sulphate.

The sodium meta-bisulphite renders the majority of metals non-toxic to cut flowers, while the 8-hydroxy quinoline potassium sulphate keeps clear and unclouded an aqueous solution of the preservative medium.

In addition, applicant has found that the 8-hydroxy quinoline potassium sulphate has the unexpected effect of prolonging the life of certain varieties of cut flowers by an extra 10% to 12%.

The preservative medium according to the invention may be provided in powder form. An aqueous solution of the preservative medium may be prepared by dissolving about 100–200 parts by weight of the medium in about 5000–6000 parts by weight of water. Such a solution may be used for preserving cut flowers by standing their stems in the solution. It must be understood, however, that aqueous solutions of different concentrations may be provided to suit different cases. The relative proportions indicated above for an aqueous solution of the preservative medium have been found to give favourable results for a variety of different flowers. Other varieties may require different concentrations.

The medium may, for example, have the following ingredients in the following ranges of proportions:

184 to 228 parts by weight sucrose as nutrient;
1.64 to 2.62 parts by weight of potassium sulphate for providing potassium and sulphate ions;
2 to 7 parts by weight of potassium dihydrogen phosphate for providing potassium and phosphate ions;
0.01 to 0.02 part by weight of boric acid to provide boron;
0.93 to 2.34 parts by weight of sodium benzoate as fermentation and mould inhibitor;
0.5 to 10 parts by weight of critic acid for pH control;
0.875 to 2.625 parts by weight of sodium meta-bisulphite as a fermentation and mould inhibitor; and
0.8 to 2.4 parts by weight of 8-hydroxy quinoline potassium sulphate to keep the medium clear.

A specific example of the preservative medium in the form of a water soluble powder, is given in the following example:

206 parts by weight of sucrose;
2 parts by weight of potassium sulphate;
3 parts by weight of potassium dihydrogen phosphate;
1.25 parts by weight of sodium benzoate;
1.5 parts by weight of citric acid;
0.01 part by weight of boric acid;
1.75 parts by weight of sodium meta-bisulphite;
1.6 parts by weight of 8-hydroxy quinoline potassium sulphate.

An aqueous solution of the preservative medium of this example is provided by dissolving 10 to 30 parts by weight of the powder in 550 to 600 parts by weight of water. This solution has a pH within the range 3.5 to 5, and is suitable for preserving a wide variety of cut flowers. The cut flowers are preserved by merely standing the cut stems of the blooms in the preservative solution provided. Preferably an aqueous solution of the preservative medium comprises about 20 parts by weight of powder dissolved in about 570 parts by weight of water.

A further example of a water soluble powder of the preservative composition according to the invention, may be prepared by mixing the following ingredients in the proportions indicated:

About 9000 parts by weight of sucrose;
About 3.5–150 parts by weight of sodium meta-bisulphite;
About 36.0 parts by weight of 8-hydroxy quinoline potassium sulphate;
About 1.6 parts by weight of mono-potassium di-hydrogen phosphate;
About 90.0 parts by weight of potassium sulphate;
About 0.8 part by weight of boric acid;
About 67.0 parts by weight of citric acid; and
About 56.0 parts by weight of sodium benzoate.

About 21 grams of the above mixture dissolved in 1 litre water gives a solution having a pH of about 4–5, and is particularly suitable for preserving roses.

The inclusion of a meta-bisulphite compound in the preservative medium according to the invention, is of particular importance, since the sulphur dioxide liberated in acid solution is an effective fermentation and mould inhibitor, which prevents premature decay of the stems, and also prevents clogging of the xylem ducts (through which liquid is transported upwards) of the stems as a result of fermentation and mould formation.

The inclusion of 8-hydroxy quinoline potassium sulphate in the preservative medium according to the invention is advantageous for various reasons: Firstly, it keeps an aqueous solution of the preservative medium clear, and in the second place it has the effect of prolonging the life of certain varieties of cut flowers by an extra 10% to 12%.

The preservative medium according to the invention not only prolongs the life of different types of cut flowers, but also improve their fragrance and colour, and in many cases also their bloom size.

Favourable results have been obtained in tests conducted with the preservative medium according to the invention on a wide variety of flowers. The test results are given in the following table:

| Name of Flower | No. of Blooms Tested | Average Life in— | | Water (days) | Place where tested | Comparative Index* |
|---|---|---|---|---|---|---|
| | | Half strength preservative solution (days) | Full strength preservative solution (days) | | | |
| (1) Alstroemeria | 150 | | 10.6 | 6.8 | Republic of S.A. | 1.5 |
| (2) Carnations | 4,921 | 14.5 | 16.6 | 7.2 | R.S.A., U.S.A., England, Holland. | 2.3 |
| (3) Centaurea cyanus | 2 | | 13.0 | 7.0 | U.S.A. | 1.9 |
| (4) Chrysanthemums | 200 | | 31.5 | 14.0 | U.S.A. | 2.2 |
| (5) Clarkia | 12 | | 12.0 | 6.0 | R.S.A. | 2.0 |
| (6) Cosmos | 2 | | 11.0 | 4.0 | U.S.A. | 2.7 |
| (7) Dahlia | 170 | 7.24 | 6.01 | 4.8 | R.S.A. | 1.5 |
| (8) Delphiniums | 275 | | 6.06 | 4.05 | R.S.A. | 1.5 |
| (9) Gladioli | 2,583 Florets | 9.9 | 8.3 | 6.4 | R.S.A. | 1.5 |
| (10) Hydrangeas | 15 | | 30.0 | 10.0 | R.S.A. | 3.0 |
| (11) Larkspurs | 200 | | 10.0 | 6.5 | R.S.A. | 1.5 |
| (12) Marigold | 20 | | 21.5 | 16.0 | U.S.A. | 1.35 |
| (13) Nasturtiums | 2 | | .9 | .3 | U.S.A. | 3.00 |
| (14) Petunias | 13 | | 8.75 | 6.6 | R.S.A. | 1.3 |
| (15) Phlox | 651 | 14.4 | 11.1 | 6.35 | R.S.A. | 2.3 |
| (16) Poppy (Calif.) | 2 | | 9.0 | 4.0 | U.S.A. | 2.25 |
| (17) Roses | 773 | 7.0 | 6.5 | 5.0 | R.S.A. | 1.4 |
| (18) Salvia farinacae | 2 | | 13 | 5.0 | U.S.A. | 2.6 |
| (19) Snapdragons | 1,977 | 8.0 | 14.6 | 7.1 | U.S.A., R.S.A. | 2.05 |
| (20) Sweetpeas | 386 | 7.0 | 8.7 | 5.7 | R.S.A. | 1.5 |
| (21) Tulips | 14 | | 14.8 | 12.1 | R.S.A. | 1.2 |
| (22) Tithonias | 2 | | 9.0 | 4.0 | U.S.A. | 2.2 |
| (23) Verbenas | 2 | | 9.0 | 5.0 | U.S.A. | 1.8 |
| (24) Zinnias | 131 | 7.7 | 9.8 | 5.3 | U.S.A., R.S.A. | 1.85 |

*Comparative Index is obtained by dividing the result in water into the best result in a solution of the preservative composition. It indicates the number of times preservative composition is as good as water, e.g. (1) Alstroemeria: 10.6/6.8=1.5.

It should be noted, as is indicated in the table for example in respect of dahlias, gladioli, phlox and roses, that certain varieties of flowers respond better in half-strength solutions of the preservative composition, so that it appears reasonable to assume that flowers which do not give favourable results in a full strength solution of the preservative composition, will probably give satisfactory results in a solution having a different concentration.

Applicant has found that the preservative composition according to the invention also has various other favourable side-effects on certain varieties of cut flowers, such as for example the following: shades of red and pink are intensified, especially in cold weather; development of ovaries and even ripe seeds after petal drop, has been observed in respect of e.g. alstroemeria, chincherinchees and delphiniums; petal drop is delayed in the case of e.g. delphiniums, larkspurs and sweetpeas.

The invention extends also to a method of preserving cut flowers by treating such cut flowers with the preservative composition according to the invention.

I claim:

1. A preservative medium for the preservation of cut flowers comprising about 1000–2000 parts by weight of sucrose as a water-soluble non-ionic nutrient medium; about 10–20 parts by weight of potassium sulphate as a source of potassium and sulphate ions; about 5–50 parts by weight of potassium dihydrogen phosphate as a source of phosphate and potassium ions and for controlling the pH of the medium; traces of boric acid as a source of boron; about 4–17 parts by weight of sodium benzoate as a fermentation and mould inhibitor; about 4–20 parts by weight of sodium meta-bisulphite as a fermentation and mould inhibitor; about 4–20 parts by weight of citric acid for controlling the pH of the medium within the range 2.5–5.5; and about 4–17 parts by weight of 8-hydroxy quinoline potassium sulphate for keeping clear an aqueous solution of the preservative medium.

2. An aqueous solution of a preservative medium according to claim 1, comprising about 100–200 parts by weight of preservative medium dissolved in about 5000–6000 parts by weight of water.

3. A preservative medium for cut flowers, comprising about 184–228 parts by weight of sucrose as nutrient medium; about 1.64–2.62 parts by weight of potassium sulphate as a source of potassium and sulphate ions; about 2–7 parts by weight of potassium dihydrogen phosphate as a source of potassium and phosphate ions and for controlling the pH of the medium; about 0.01–0.02 part by weight of boric acid as a source of boron; about 0.93–2.34 parts by weight of sodium benzoate as fermentation and mould inhibitor; about 0.875–2.625 parts by weight of sodium meta-bisulphite as fermentation and mould inhibitor; about 0.8–2.4 parts by weight of 8-hydroxy quinoline potassium sulphate for keeping an aqueous solution of the medium clear; and about 0.5–10 parts by weight of citric acid for controlling the pH of the medium within the range 2.5–5.5.

4. A preservative medium according to claim 3, which comprises about 206 parts by weight of sucrose as nutrient medium; about 2 parts by weight of potassium sulphate as a source of potassium and sulphate ions; about 3 parts by weight of potassium dihydrogen phosphate as a source of potassium and phosphate ions and for controlling the pH of the medium; about 0.01 part by weight of boric acid as a source of boron; about 1.25 parts by weight of sodium benzoate as fermentation and mould-inhibitor; about 1.75 parts by weight of sodium meta-bisulphite as fermentation and mould inhibitor; about 1.6 parts by weight of 8-hydroxy quinoline potassium sulphate for keeping an aqueous solution of the medium clear; and about 1.5 parts by weight of citric acid for controlling the pH of the medium within the range 2.5–5.5.

5. An aqueous solution of the preservative medium according to claim 3, which comprises about 10–30 parts by weight of the preservative medium dissolved in about 550–600 parts by weight of water.

6. An aqueous solution of the preservative medium according to claim 4, which comprises about 20 parts by weight of the preservative medium dissolved in about 570 parts by weight of water.

7. A method of preserving cut flowers, comprising standing the flowers in an aqueous solution as defined in claim 2.

8. A method of preserving cut flowers, which comprises standing the flowers in an aqueous solution as defined in claim 5.

9. A method of preserving cut flowers, which comprises standing the flowers in an aqueous solution as defined in claim 6.

References Cited by the Examiner

UNITED STATES PATENTS

| 2,805,137 | 9/1957 | Clopton | 71—2.4 |
| 3,122,432 | 2/1964 | Biggs | 71—2.4 |

FOREIGN PATENTS 1,309,955  10/1962  France.

LEWIS GOTTS, *Primary Examiner.*

JAMES O. THOMAS, Jr., *Assistant Examiner.*